Oct. 28, 1924.
H. B. MASSEY
1,513,335
AIR COOLED ENGINE
Filed Feb. 24, 1920 4 Sheets-Sheet 1
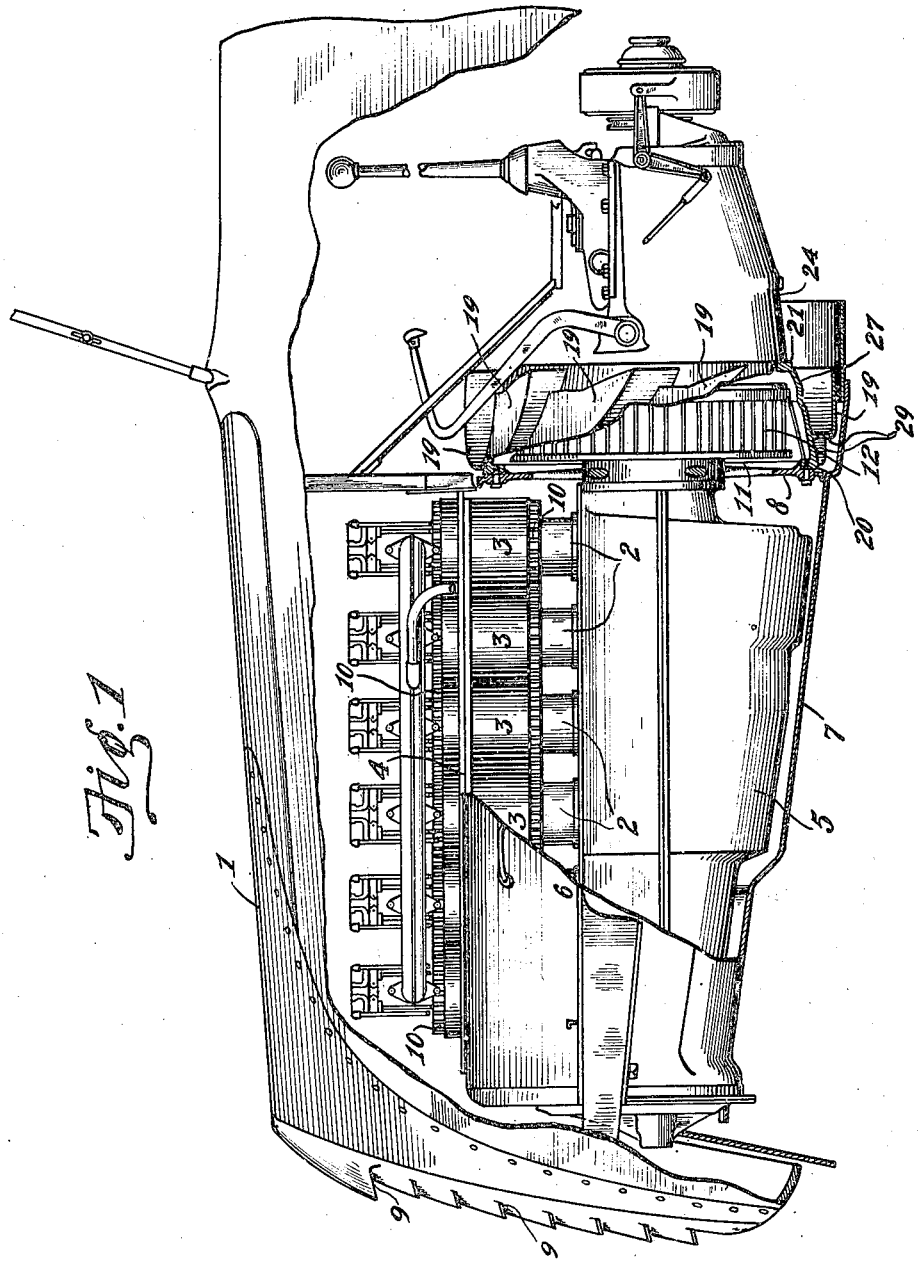
INVENTOR
Hemsley B. Massey
BY: Freass, Merkel, Saywell and Bond
ATTYS.

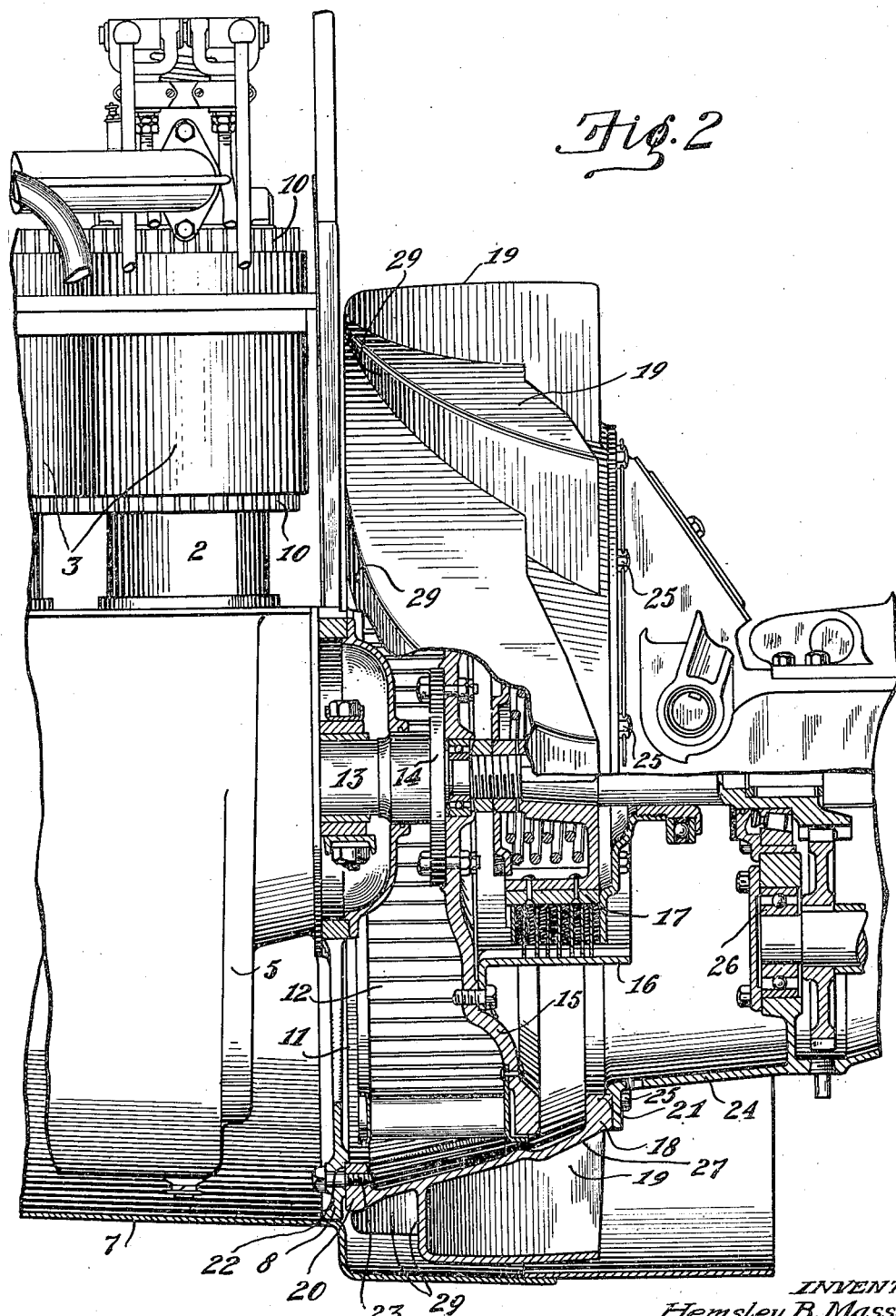

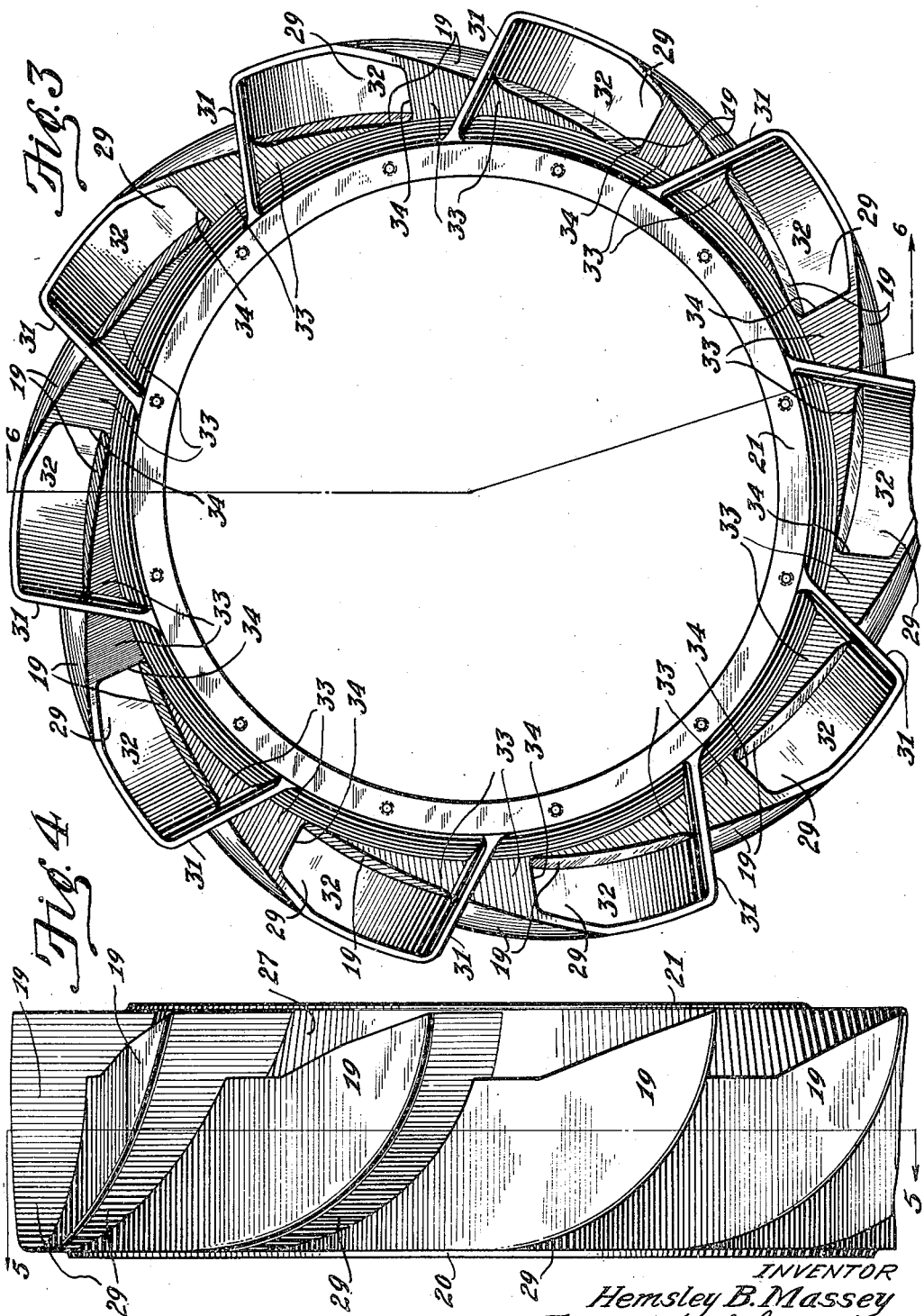

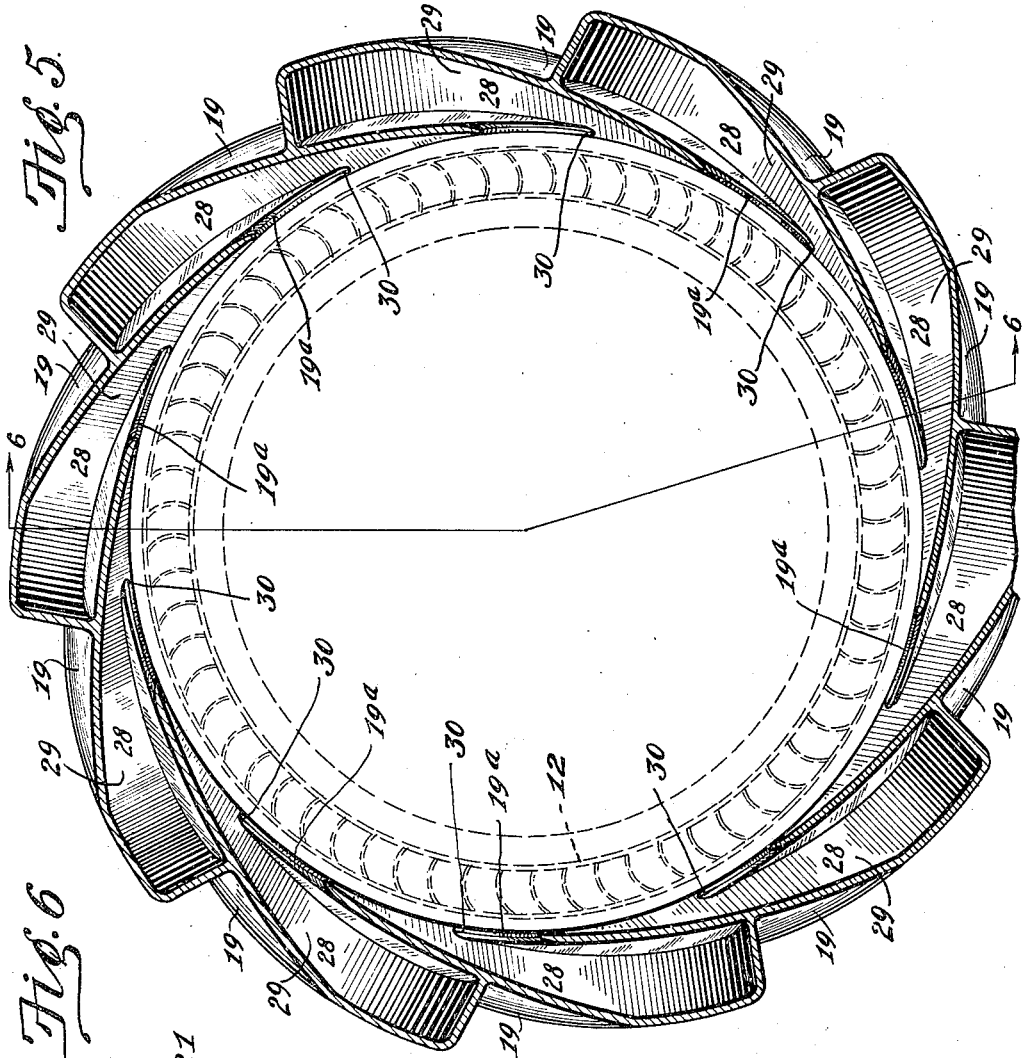
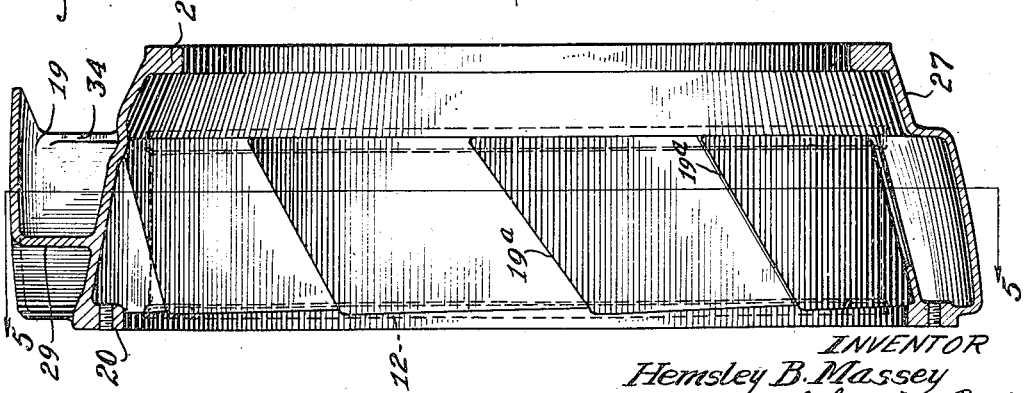

Patented Oct. 28, 1924.

1,513,335

UNITED STATES PATENT OFFICE.

HEMSLEY B. MASSEY, OF CANTON, OHIO; BY OPERATION OF LAW TO E. A. McCUSKEY, TRUSTEE IN BANKRUPTCY OF THE HOLMES AUTOMOBILE COMPANY, OF CANTON, OHIO, A CORPORATION OF OHIO.

AIR-COOLED ENGINE.

Application filed February 24, 1920. Serial No. 360,668.

*To all whom it may concern:*

Be it known that I, HEMSLEY B. MASSEY, a citizen of the United States, residing at Canton, in the county of Stark and State of Ohio, have invented certain new and useful Improvements in Air-Cooled Engines, of which the following is a specification.

The invention relates to air cooled internal combustion engines for automobiles, trucks, tractors, stationary engines of small size and other uses, and the object of the improvement is to increase the efficiency of the cooling system, and to extend the power capacity and continuous performance of such engines, and the variety and range of work for which they may be employed.

The power capacity and continuous performance of air cooled engines depends upon the volume of and the efficiency with which cooling air is continuously drawn past the cooling fins on the cylinders, within a given period and at a given speed and power, and the ultimate object of the present invention is to increase the continuous air moving capacity of the centrifugal exhaust fans which have commonly been combined with engines of this type; with a further object of utilizing the fan case forming a new element in the operating combination, for connecting the transmission of the engine to form a unit power plant; and with the minor purpose of discharging the exhaust air directly rearward from the periphery of the fan.

These objects are attained in a practical embodiment of the invention which has given surprisingly successful beneficial results, by providing a peripheral case extending entirely around the fan wheel with spiral ducts arranged to conduct and deflect the air from the tangential course in which it is discharged by the fan wheel, into a course directly rearward of the machine, substantially parallel with the axis thereof; and by securing the forward end of the fan case directly to the rear support of the engine, and securing the transmission directly to the rear end of the fan case.

Such an embodiment of the invention is illustrated in the accompanying drawings, in which—

Figure 1 is an outline side elevation of the forward portion of an automobile with parts broken away, showing the implovement in place;

Fig. 2, a similar elevation with parts broken, showing the fan, its case and adjacent parts of the machine;

Fig. 3, a rear elevation of the face case, detached from the machine;

Fig. 4, a side elevation of the same, looking from left to right;

Fig. 5, a transverse section of the fan case on line 5—5, Figs. 4 and 6, showing the fan wheel in broken lines therein; and Figure 6, an axial section of the fan case on line 6—6, Figs. 3 and 5, also showing the fan wheel in broken lines therein.

Similar numerals refer to similar parts throughout the drawings.

The engine hood 1, the cylinders 2, the jackets 3, the deck 4, the crank case 5, the side closure 6, the boot 7, the rear support 8, and the other engine parts may be of any well known construction and arrangement for directing cooling air from the front portal 9 of the hood through the cylinder cooling flues formed by the cylinder fins 10 and the surrounding jacket 3, and through the communicating suction chamber formed by the side closure and the boot, to the inlet opening 11 of the exhaust fan.

The fan wheel 12 illustrated is of an ordinary centrifugal type, and is securely mounted upon the rear end of the engine shaft 13 by the flange 14 and the fly wheel 15 in the usual manner, and on the rear side of the fly wheel is secured the clutch drum 16, carrying the usual clutch mechanism 17.

The fan case 18 is in the general form of a series of spiral shells 19 cast between or upon the end rims 20 and 21; the larger forward rim 20 being secured directly to the outer rim 22 of the rear support 8 of the engine by means of bolts as 23, and to the smaller rear rim 21 is directly secured the transmission housing 24 by means of bolts, as 25, in which housing is mounted the usual transmission mechanism 26. The integral conical collar 27 is preferably interposed between the spiral shells 19 and the rear rim 21, to extend the case to the rear side of the clutch mechanism.

The inner end or edges 19ª of the spiral shells 19 are located in cylindrical aline- ment at spaced intervals apart, adjacent to the periphery of the fan wheel, as best shown in Fig. 5; whence the several shells diverge spirally, and constitute the inner and outer walls, respectively of the similar spiral air ducts 28.

The forward wall 29 of each air duct is in the nature of a radial flange, emerging from the forward rim at the juncture 30 therewith of the inner edge of the spiral wall 19 forming the outer wall of the particular duct; whence the forward wall increases in height with the divergency of the outer spiral wall, and when it approaches the maximum divergency of the outer wall the forward wall curves rapidly rearward to form one side or radial edge 31 of the outlet mouth 32 of its own spiral duct opening directly rearward from the fan case, as best shown in Fig. 3.

The rearward wall 33 of each air duct, extends as a radial triangular flange, between the forward edge of the conical collar 27 and the outer spiral wall 19 of the particular duct, and terminates at the other side or edge 34 of the outlet mouth 32 of its own spiral duct.

The inner ends or edges 19ª of the spiral shells 19, are inclined at a substantial angle from the axis of the fan, as best shown in Fig. 6, not only for the purpose of enlarging the throats of the air ducts at the rear sides thereof, but for the further important purpose of preventing a whistling or roaring of the air, as it is cut by these edges upon entering the ducts; and for further preventing a noisy vibration, these edges are made of substantial thickness with a round or blunt bevel, as shown in Fig. 5, of the drawings.

The fan case thus described constitutes a rigid connection between the transmission and the engine, and extends entirely around the periphery of the fan wheel without in any way obstructing the operation of the fan.

On the contrary, the fan case more than doubles the volume of air moved by the fan wheel, over the action of the same fan without a case and in discharging the air into the open deflects it directly toward the rear of the machine, and decreases the wind resistance of the machine and the blowing of dust from the road.

The combination of the fan case with the fan, the suction chamber and the cylinder fins and jackets, renders it possible to air cool engines of larger power capacity, and to use a higher cylinder compression ratio, thus increasing engine efficiency; and these results as well as the increase in the volumetric efficiency of the fan, caused by the presence of the casing, are accomplished at the same fan speed and without absorbing any more power for driving the fan.

It will be understood that the use of a plurality of air ducts and the spiral form and rearward curving of the same, are not essential to the generic invention, but these specific features of construction and arrangement are preferred for the saving of space and the described benefits resulting therefrom.

I claim:

1. The combination of the cylinder cooling flues and communicating suction chamber of an automobile engine or the like with a centrifugal fan wheel exhausting air therefrom, and a peripheral case extending entirely around the wheel forming spiral shells leading tangentially from the fan wheel, dividing and directing the discharge into the open and increasing the volume of air moved by the fan wheel.

2. The combination of the cylinder cooling flues and communicating suction chamber of an automobile engine or the like with a centrifugal fan wheel exhausting air therefrom, and a peripheral case extending entirely around the wheel forming air ducts leading tangentially from the fan wheel, directing the discharge into the open and increasing the volume of air moved by the fan wheel.

3. The combination of the cylinder cooling flues and communicating suction chamber of an automobile engine or the like with a centrifugal fan wheel exhausting air therefrom, and a peripheral case extending entirely around the wheel forming curved air ducts leading tangentially, discharging rearwardly into the open, and increasing the volume of air moved by the fan wheel.

4. The combination of the cylinder cooling flues and communicating suction chamber of an automobile or the like with a centrifugal fan wheel exhausting air therefrom, and a peripheral case extending entirely around the wheel including walls forming air ducts leading tangentially into the open from the fan wheel, the inner edges of the walls being formed at an angle to the axis of the fan.

5. The combination of the cylinder cooling flues and communicating suction chamber of an automobile engine or the like with a centrifugal fan wheel exhausting air therefrom, and a peripheral case extending entirely around the wheel including walls dividing and directing air into the open from the fan wheel, the inner ends of the walls being located adjacent to the periphery of the fan wheel and being formed at an angle to the axis thereof.

6. The combination of the cylinder cooling flues and communicating suction chamber of an automobile engine or the like with a centrifugal fan wheel exhausting therefrom, and a peripheral case extending entirely around the wheel including walls dividing and directing air into the open from the wheel, the inner ends of the walls being located adjacent to the periphery of the fan and being made of substantial thickness with a blunt beveled edge.

7. In an automobile engine, a rear support, an adjacent transmission housing, a shaft bearing in the engine, a centrifugal fan wheel on the shaft between the support and the housing, and a cylindric shell connecting the support and the housing forming flues directing the discharge of air into the open from the wheel.

HEMSLEY B. MASSEY.